A. A. FRECHETTE.
CATTLE GUARD.
APPLICATION FILED NOV. 13, 1914.
1,194,832.
Patented Aug. 15, 1916.
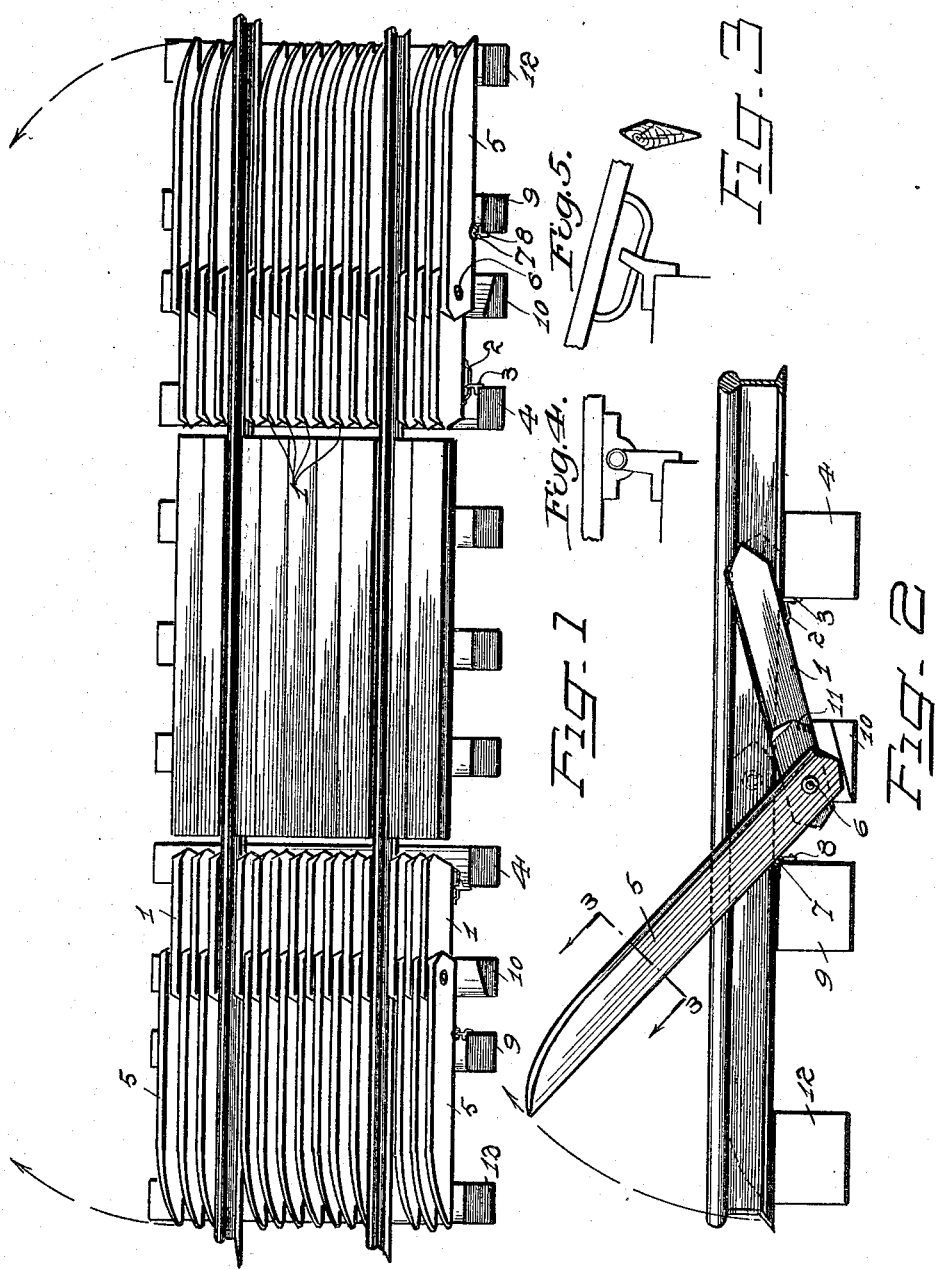
Witnesses:
ALFRED ANTOINE FRECHETTE, Inventor
By
Attorneys

UNITED STATES PATENT OFFICE.

ALFRED ANTOINE FRECHETTE, OF GRAND FORKS, BRITISH COLUMBIA, CANADA.

CATTLE-GUARD.

1,194,832.  Specification of Letters Patent.  Patented Aug. 15, 1916.

Application filed November 13, 1914. Serial No. 871,873.

*To all whom it may concern:*

Be it known that I, ALFRED ANTOINE FRECHETTE, a subject of the King of Great Britain, residing at Grand Forks, Province of British Columbia, Canada, have invented certain new and useful Improvements in Cattle-Guards; and I do hereby declare that the following is a full, clear, and exact description of the invention, such as will enable others skilled in the art to which it appertains to make and use the same.

The invention to be hereinafter described relates to cattle guards.

In order to more clearly disclose the construction, operation, and use of the invention, reference should be had to the accompanying drawings forming part of the present application.

Throughout the several figures of the drawings like reference characters designate the same parts.

In the drawings: Figure 1 is a perspective side view of the guard in normal position; Fig. 2 is a detail view showing the guard partly raised; and Fig. 3 is a section on line 3—3 of Fig. 2 looking in the direction of the arrows.

The main objects of the invention are, to provide a neat, strong, durable, and easily operated railway cattle guard, of light construction, which will not become inoperative from clogging with snow, or the like.

At each side of the crossing place a number of relatively short members or pieces 1, of any suitable material, of diamond shape in cross section, on the under face of each of which, near the inner end thereof, is secured an elongated U bracket 2. A rod 3, the ends of which are turned down at right angles and secured to a tie 4, is passed through brackets 2. The pieces 1 are provided, near their outer ends, with bores adapted to be alined with bores through the relatively long arms 5, near the inner end thereof. A suitable rod 6 is passed through the alined bores so as to hingedly connect the pieces 1 and arms 5. Each of the arms 5 is provided, on its under face, and near the inner end thereof, with an eye 7. A rod 8, similar to rod 3, is passed through the alined eyes 7, and secured to tie 9. A tie 10 about midway between ties 4 and 9, is cut much lower than the other ties and has its upper face beveled downwardly and outwardly. This tie is located beneath rod 6 which hingedly connects pieces 1 and arms 5, and permits the necessary movement of the said members.

Any animal attempting to get on to the track, from the crossing, will step on the short pieces 1. This will force the outer ends thereof down, and will also force down the inner ends of arms 5, so as to rock them on rod 8 and lift the outer ends thereof, thus raising these arms into vertical position. This places a fencelike barrier in the path of the animal which effectually prevents its entry on to the track. When the pressure on pieces 1 is released, arms 5, because of their greater length and weight, drop back into their normal position and return pieces 1 to their normal position. This movement necessitates a slight inward and outward movement of pieces 1, which is permitted by brackets 2.

As will be noted, the pieces 1 and arms 5 are of an approximate diamond shape in cross section, the lower or underneath part of the diamond being rather elongated or tapered. Also, the pieces 5 have their upper faces arched downwardly and outwardly, at their outer ends. By this construction, snow, or the like, will not interfere with the operation of the device, as the pieces 1 and arms 5 will readily pass therethrough. As will be noted, this guard is, of course, formed in three sections for single track railways, one between the rails and one on each side of the track. It will be obvious, that my guard can be made in as many sections as desired, depending on special circumstances, as the number of tracks, &c.

As will be noted from Fig. 2 of the drawings, each of the pieces 1 is provided, at its outer end, in the face adjacent the arm 5, with a V shaped recess 11 which is adapted to receive the V shaped inner end of arm 5, when in normal position. This maintains pieces 1 and arms 5 in a horizontal position, from which position they are most easily operated, when not in use, and also effectually prevents movement of the outer ends of members 1 or the inner ends of members 5 above the horizontal. To avoid undue strain, the arms 5, in normal position, rest on ties 9 and 12.

It is thought that the construction, operation, and use of the invention will be clear from the preceding detailed description.

Changes may be made in the construction, arrangement, and disposition of the several parts of the invention without in any way departing from the field and scope of the same, and it is meant to include all such within this application wherein only a preferred form has been disclosed.

Having thus fully described my invention, what I claim as new and desire to secure by Letters Patent is:

In a cattle guard, in combination with the ties of a railway, a plurality of actuating arms, means for pivoting the arms to a tie to permit a rocking and a slight longitudinal movement, a plurality of arms pivoted to the first named arms and formed of an elongated diamond cross section, and means for pivoting the latter arms to a tie to permit a rocking movement, each of the actuating arms being provided with a recess having an inclined wall and each of the other arms having a pointed end arranged to abut the inclined wall adjacent thereto to prevent movement of the arms past the horizontal position when the arms are in normal position.

In witness whereof I have hereunto set my hand in the presence of two witnesses.

ALFRED ANTOINE FRECHETTE.

Witnesses:
E. EUGENE GIBSON,
HILDA BARRON.

Copies of this patent may be obtained for five cents each, by addressing the "Commissioner of Patents, Washington, D. C."